Sept. 8, 1953 W. W. WARNER 2,651,747
INSTANTLY REVERSIBLE MOTOR
Filed April 25, 1951
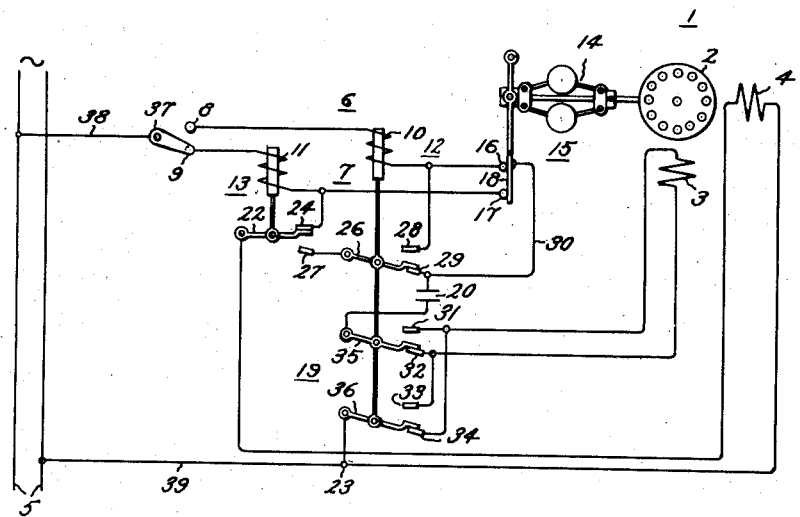
Inventor:
Wilbur W. Warner,
by Ernest C. Britton
His Attorney.

Patented Sept. 8, 1953

2,651,747

UNITED STATES PATENT OFFICE 2,651,747

INSTANTLY REVERSIBLE MOTOR

Wilbur W. Warner, Fort Wayne, Ind., assignor to General Electric Company, a corporation of New York Application April 25, 1951, Serial No. 222,861

10 Claims. (Cl. 318—203)

1

This invention relates to instantly reversible motors and more particularly to an instantly reversible, self-starting, single phase, alternating current motor having three external leads.

In certain applications, for example, door opening mechanisms and other types of actuators, it is desirable to provide a motor circuit which is instantly reversible and it is further desirable to arrange this circuit so that a minimum number of external leads are required.

The object of this invention is, therefore, to provide an improved instantly reversible self-starting, single phase alternating current motor having a minimum number of external leads.

Further objects and advantages of this invention will become apparent and the invention will be better understood by reference to the following description and the accompanying drawing, and the features of novelty which characterize this invention will be pointed out with particularity in the claims annexed to and forming a part of this specification.

In its broadest aspects, this invention contemplates a single phase motor having a running winding and a starting winding. A pair of circuits are respectively connected to the starting winding and a selective switch is provided for selectively connecting one of the circuits to a source of alternating current for energizing the starting winding. Means responsive to the speed of the motor is provided arranged to disconnect both of the starting winding circuits when the motor reaches a predetermined speed and to close the circuits again when the speed falls substantially below the predetermined value. Means operable in response to energization of the starting winding circuits are provided to connect the running winding in circuit with the starting winding circuit selected by the selector switch and means are further provided for holding this connection when the starting winding circuits are opened by the speed responsive means. Reversal of the starting winding connections to accomplish reverse of the motor is provided by means responsive to energization of one of the starting winding circuits and means are provided to connect the starting and running windings when neither of the starting winding circuits are energized to provide a regenerative braking circuit.

The single figure of the drawing is a schematic illustration of the improved instantly reversible motor of this invention.

Referring now to the drawing, there is shown a motor 1, for example an induction motor having a squirrel cage rotor 2 with a starting winding 3

2 and a running winding 4. Energization for the motor is provided by an external source of alternating current (not shown) through lines 5. In order to provide for instant reversal of the motor 1, a pair of circuits 6 and 7 are provided each having one end connected to external terminals 8 and 9 and their other ends connected to the starting winding 3, as will be hereinafter described. Coils 10 and 11 of relays 12 and 13 respectively are arranged in series in the circuits 6 and 7 and centrifugal mechanism 14 driven by the rotor 2 of the motor 1 actuates switch 15 to open contacts 16 and 17 in the circuits 6 and 7. The movable element 18 of switch 15 is connected to the starting winding 3 through starting capacitor 20 and reversing switch 19, as will be hereinafter described.

Relay 13 has its movable element 22 connected to one side of the running field winding 4 and the other side of the running field winding connected to the third external terminal 23. Normally open contact 24 of relay 11 is connected to circuit 7 on the side of coil 11 remote from the external terminal 9. The relay 12 has its movable element 26 connected to the normally closed contact 27 of relay 13 with the normally open contact 28 being connected to the circuit 6 on the side of coil 10 remote from the external terminal 8. The normally closed contact 29 of the relay 12 is connected to the line 30 which in turn connects the movable element 18 of switch 15 and the starting capacitor 20. The two ends of the starting winding 3 are respectively connected to stationary contacts 31 and 32, and 33 and 34 of reversing switch 19. Movable element 35 of reversing switch 19 associated with stationary contacts 31 and 32 is connected to starting capacitor 20 and movable element 36 associated with stationary contacts 33 and 34 is connected to the third external terminal 23. Reversing switch 37 serves to selectively connect the external terminals 8 and 9 to the source of alternating current 5 through line 38 and the external terminal 23 may be also connected to the source of alternating current through line 39.

In operation, assuming that the selector switch 37 is thrown to the lower position contacting external terminal 9, as shown in the drawing, with the motor at rest, and with relays 12 and 13 initially de-energized, the contacts 27 of relay 13 and 28 of relay 12 will be in their normally closed positions, and contacts 16 and 17 of switch 15 will be closed. A circuit will thus be established from terminal 9 through relay coil 11, contact 17 of switch 15, line 30, capacitor 20, contact 32, starting winding 3, contact 34 to external terminal 23. Thus, the starting winding 3 will be energized through the capacitor 20 and the coil 11 of relay 13 will also be energized completing a connection between contact 24 and running winding 4. A second circuit is now established from the circuit 7 through normally open contact 24 of relay 13, running winding 4 to external terminal 23. Thus, running winding 4 is now energized through the contact 24 which is now closed. The motor will now start by virtue of the electrical phase displacement between the starting winding 3 and the running winding 4 provided by the capacitor 20 and it will be observed that the relay 13 is now sealed in by virtue of the closing of contact 24.

When the motor 1 reaches a predetermined speed, the centrifugal mechanism 14 will open the contacts 16 and 17 of switch 15, thus opening both of the circuits 6 and 7. This opens the circuit of the starting winding 3 so that the motor is running on the running winding 4 alone. However, as pointed out above, the relay 13 is sealed in so that coil 11 remains energized holding contact 21 closed so that running winding 4 is energized.

Assuming now that reversal of the motor is desired and that the reversing switch 37 is instantaneously moved to contact external terminal 8. This immediately opens the circuit of coil 11 of relay 13 so that contact 24 opens. Coil 10 of relay 12, however, will not be energized since the motor 1 is still rotating and the centrifugal mechanism 14 has not as yet closed the contacts 16 and 17 of the switch 15. Since contact 27 of relay 13 and contact 29 of relay 12 are now both closed, a regenerative braking circuit is now established starting with normally closed contact 27 of relay 13 through normally closed contact 29 of relay 12, capacitor 20, stationary contact 32 of reversing switch 19, starting winding 3, stationary contact 34 of reversing switch 19, and running winding 4, back to normally closed contact 27. The motor now is plugged so that the speed is rapidly reduced and when a predetermined speed is reached, the centrifugal mechanism 14 closes switch 15 so that contacts 16 and 17 are closed. The closing of contact 16 causes completion of circuit 6 so that coil 10 of relay 12 will be energized. Energization of coil 12 causes closing of contact 28 and operation of the reversing switch 19. With contact 28 closed, the running winding 4 is now again directly energized starting with circuit 6 through contact 28 in its closed position, contact 27 in its closed position to external terminal 23. Energization of coil 10 of relay 12 has also produced operation of the reversing switch 19 to reverse the connections of the starting winding 3. The motor will now continue to reverse and will then start in the opposite direction of rotation by virtue of the reversed connection of the starting winding 3. When the predetermined speed is reached, the centrifugal mechanism 14 will open the contacts 16 and 17 of switch 15 again disconnecting the starting winding 3. However, it will be observed that the coil 10 of relay 12 is also sealed in through its picked up contact 28 and the closed contact 27 of relay 13 so that running winding 4 is still energized. It will be readily apparent that shifting the reversing switch 37 to the first position 9 will produce another reversal of the motor in the manner described above.

It will now be readily apparent that this invention provides an improved and simplified circuit for an instantly reversible, self-starting, single phase alternating current motor characterized by its simplicity and the fact that only three external terminals are needed, i. e., terminals 8, 9 and 23. Thus, if the reversing switch 37 is located at a remote position, only three lines need be brought out from the motor to the reversing switch, thus eliminating the usual cable containing a larger number of wires.

While I have shown and described a particular embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What I claim as new and desire to secure by Letters Patent of the United States is:

1. An instantly reversible, self-starting, single phase alternating current motor having a running winding and a starting winding, a pair of circuits connected to said starting winding for energizing the same, means for selectively connecting one of said circuits to a source of alternating current for selecting the direction of rotation of said motor, means responsive to the speed of said motor for opening both of said circuits when said motor speed exceeds a predetermined value whereby said starting winding is disconnected and for closing said circuits when said motor speed falls substantially below said predetermined value, each of said circuits having circuit establishing means respectively energizable responsive to energization of said circuits arranged to connect said running winding in circuit with the circuit selected by said selective means for energization therefrom, means for sealing said running winding connection when said circuits are opened by said speed responsive means whereby only said starting winding is disconnected, one of said circuit establishing means connecting said starting winding for energization in one sense responsive to energization of its associated circuit and for energization in the reverse sense responsive to de-energization thereof whereby said motor is reversed, and a regenerative braking circuit including said running winding and said starting winding and both of said circuit establishing means are unenergized.

2. An instantly reversible, self-starting, single phase alternating current motor having a running winding and a starting winding and three external terminals, a pair of circuits each having one end connected to said starting winding for energizing the same and having their other ends respectively connected to two of said external terminals, said two external terminals being adapted to be selectively connected to a source of alternating current for selecting the direction of rotation of said motor, means responsive to the speed of said motor for opening both of said circuits when said motor reaches a predetermined speed whereby said starting winding is disconnected and for closing said circuits when said motor speed falls substantially below said predetermined speed, each of said circuits having circuit establishing means respectively energizable responsive to energization of said circuits arranged to connect said running winding in circuit with the circuit selected by said selective means for energization therefrom, means for sealing said running winding connection when said circuits are opened by said speed responsive means whereby only said starting winding is disconnected, one of said circuit establishing means connecting said starting winding for energization in one sense responsive to energization of its associated circuit and in the reverse sense responsive to de-energization thereof whereby said motor is reversed, and a regenerative braking circuit including said running winding and said starting winding and both of said circuit establishing means when said circuit establishing means are unenergized, said running and starting windings being connected to the third of said terminals.

3. An instantly reversible, self-starting, single phase alternating current motor having a running winding and a starting winding, a pair of circuits connected to said starting winding for energizing the same, a pair of relays having their coils respectively arranged in said circuits, means for selectively connecting one of said circuits to a source of alternating current for selecting the direction of rotation of said motor, means responsive to the speed of said motor for opening both of said circuits when said motor speed exceeds a predetermined value whereby said starting winding is disconnected and for closing said circuits when said motor speed falls substantially below said predetermined value, said relays being respectively energizable responsive to an electrical characteristic of said circuits and arranged to connect said running winding in circuit with the circuit selected by said selective means for energization therefrom, means for sealing said running winding connection when said circuits are opened by said speed responsive means whereby only said starting winding is disconnected, one of said relays connecting said starting winding for energization in one sense responsive to energization of said one relay, and in the reverse sense responsive to de-energization thereof whereby said motor is reversed, and a regenerative braking circuit including said running winding and said starting winding and both of said relays when said relays are unenergized.

4. An instantly reversible, self-starting, single phase alternating current motor having a running winding and a starting winding and three external terminals, a pair of circuits each having one end connected to said starting winding for energizing the same and having their other ends respectively connected to two of said terminals, a pair of relays having their coils respectively arranged in said circuits in series relation therewith, said two external terminals being adapted to be selectively connected to a source of alternating current for selecting the direction of the rotation of said motor, means responsive to the speed of said motor for opening both of said circuits when said motor speed exceeds a predetermined value whereby said starting winding is disconnected and for closing said circuits when said motor speed falls substantially below said predetermined value, said relays being respectively energizable responsive to the current in said circuits and arranged to connect said running winding in circuit with the circuit selected by said selective means for energization therefrom, means for sealing said running winding connection when said circuits are opened by said speed responsive means whereby only said starting winding is disconnected, one of said relays connecting said starting winding in one sense responsive to energization of said one relay and in the reverse sense responsive to deenergization thereof whereby said motor is reversed, and a regenerative braking circuit including said running winding and said starting winding and both of said relays when said relays are unenergized, said running and starting windings being connected to the third of said terminals.

5. An instantly reversible, self-starting, single phase alternating current motor having a running winding and a starting winding, a pair of circuits connected to said starting winding for energizing the same, a pair of relays having their coils respectively arranged in said circuits in series relation therewith, means for selectively connecting one of said circuits to a source of alternating current for selecting the direction of rotation of said motor, speed responsive means on said motor having a contact arranged in each of said circuits for opening both of said circuits when said motor speed exceeds a predetermined value whereby said starting winding is disconnected and for closing said circuits when said motor speed falls substantially below said predetermined value, another pair of circuits respectively connecting said first mentioned circuits to said running winding, said relays being respectively energizable responsive to current in said first mentioned circuits and having contacts respectively arranged in said other circuits for connecting said running winding in circuit with the one of said first mentioned circuits selected by said selective means for energization therefrom, said relay contacts when closed respectively connecting said relay coils for energization through said running winding so that relay coils are not de-energized when said first mentioned circuits are opened by said speed responsive means whereby only said starting winding is disconnected, one of said relays having other contacts connecting said starting winding in one sense responsive to energization of said one relay and in the reverse sense responsive to de-energization thereof whereby said motor is reversed, and a regenerative braking circuit including said running winding and said starting winding and said first mentioned relay contacts when said relays are unenergized.

6. An instantly reversible, self-starting, single phase alternating current motor having a running winding and a starting winding and three external terminals, a pair of circuits each having one end connected to said starting winding for energizing the same and having their other ends respectively connected to two of said external terminals, a pair of relays having their coils respectively arranged in said circuits in series relation therewith, said two external terminals being adapted to be selectively connected to a source of alternating current for selecting the direction of rotation of said motor, speed responsive means on said motor having a contact arranged in each of said circuits for opening both of said circuits when said motor speed exceeds a predetermined value whereby said starting winding is disconnected and for closing said circuits when said motor speed falls substantially below said predetermined value, another pair of circuits respectively connecting said first-mentioned circuits to said running winding, said relays being respectively energizable responsive to current in said first mentioned circuits and having contacts respectively arranged in said other circuits for connecting said running winding in circuit with the one of said first mentioned circuits selected by said selective means for energization therefrom, said relay contacts when closed respectively connecting said relay coils for energization through said running winding so that said relay coils are not de-energized when said first mentioned circuits are opened by said speed responsive means, one of said relays having other contacts connecting said starting winding for energization in one sense responsive to energization of said one relay and in the reverse sense responsive to de-energization thereof whereby said motor is reversed, and a regenerative braking circuit including said running winding and said starting winding and said first mentioned relay contacts when said relays are unenergized, said running and starting windings being connected to the third of said terminals.

7. An instantly reversible, self-starting, single phase alternating current motor having a running winding and a starting winding, a pair of circuits connected to said starting winding for energizing the same, a pair of relays having their coils respectively arranged in said circuits in series relation therewith, means for selectively connecting one of said circuits to a source of alternating current for selecting the direction of rotation of said motor, speed responsive means on said motor having contacts arranged in each of said circuits for opening both of said circuits when said motor speed reaches a predetermined value whereby said starting winding is disconnected and for closing said circuits when said motor speed falls below said predetermined value, another pair of circuits respectively connecting said running winding to the sides of said relay coils remote from said selective means, said relays being respectively energizable responsive to current in said first mentioned circuits and having contacts respectively arranged in said other circuits for connecting said running winding in circuit with the one of said first mentioned circuits selected by said selected means for energization therefrom, relay contacts when closed respectively connecting said relay coils through said running winding so that said relay coils are not de-energized when said first mentioned circuits are opened by said speed responsive means, one of said relays having other contacts connecting said starting winding for energization in one sense responsive to energization of said one relay and in the reverse sense responsive to deenergization thereof whereby said motor is reversed, and a regenerative braking circuit including said running winding and said starting winding and said first mentioned relay contacts when said relays are unenergized.

8. An instantly reversible, self-starting, single phase alternating current motor having a running winding and a starting winding and three external terminals, a pair of circuits each having one end connected to such starting winding for energizing the same and having their other ends respectively connected to two of said external terminals, a pair of relays having coils respectively arranged in said circuits in series circuit relation therewith, said two external terminals being adapted to be selectively connected to a source of alternating current for selecting the direction of rotation of said motor, speed responsive means on said motor having contacts arranged in each of said circuits for opening both of said circuits when said motor speed exceeds a predetermined value whereby said starting winding is disconnected and for closing said circuits when said motor speed falls substantially below said predetermined value, another pair of circuits respectively connecting said running winding to the sides of said relay coils remote from said terminals, said relays being respectively energizable responsive to current in said circuits and having contacts respectively arranged in said other circuits for connecting said running winding in circuit with the one of said first mentioned circuits selected by said selecting means for energization therefrom, said relay contacts when closed respectively connecting said relay coils for energization through said running winding so that said relay coils are not de-energized when said circuits are opened by said speed responsive means, one of said relays having other contacts connecting said starting winding for energization in one sense responsive to energization of said one relay and in the reverse sense responsive to de-energization thereof whereby said motor is reversed, and a regenerative braking circuit including said running winding and said starting winding and said first mentioned relay contacts when said relays are unenergized, said running and starting windings being connected to the third of said terminals.

9. An instantly reversible, self-starting, single phase alternating current motor having a running winding and a starting winding, a pair of circuits connected to said starting winding for energizing the same, a capacitor arranged in circuit with said starting winding for providing a phase displacement between said starting winding and said running winding, a pair of relays having their coils respectively arranged in said circuits in series relation therewith, means for selectively connecting one of said circuits to a source of alternating current for selecting the direction of rotation of said motor, speed responsive means on said motor having contacts arranged in each of said circuits for opening both of said circuits when said motor speed exceeds a predetermined value whereby said starting winding is disconnected and for closing said circuits when said motor speed falls substantially below said predetermined value, another pair of circuits respectively connecting said running winding to said first circuits, said relays being respectively energizable responsive to current in said first circuits and having contacts respectively arranged in said other circuits for connecting said running winding in circuit with the circuit selected by said selective means for energization therefrom, said relay contacts when closed respectively connecting said relay coils for energization through said running winding so that said relay coils are not de-energized when said first mentioned circuits are opened by said speed responsive means, said relays having other contacts connecting said starting winding for energization in one sense responsive to energization of said one relay and in the reverse sense responsive to de-energization thereof whereby said motor is reversed, and a regenerative braking circuit including said running winding and said starting winding and said first mentioned relay contacts when said relays are unenergized.

10. An instantly reversible, self-starting, single phase alternating current motor having a running winding and a starting winding and three external terminals, a pair of circuits each having one end connected to said starting winding for energizing the same and having their other ends respectively connected to two of said external terminals, a pair of relays having coils respectively arranged in said circuits in series relation therewith, said two external terminals being adapted to be selectively connected to a source of alternating current, a capacitor arranged in circuit with said starting winding for providing an electrical phase displacement between said starting and running windings, speed responsive means on said motor having contacts arranged in each of said circuits for opening both of said circuits when said motor speed exceeds a predetermined value whereby said starting winding is disconnected and for closing said circuits when said motor speed falls substantially below said predetermined value, another pair of circuits respectively connecting said running winding to said first circuits, said relays being respectively energizable responsive to current in said first circuits and having contacts respectively arranged in said other circuits for connecting said running winding in circuit with the one of said first mentioned circuits selected by said selected means for energization therefrom, said relay contacts when closed respectively connecting said relay coils for energization through said running winding so that said relay coils are not de-energized when said first mentioned circuits are opened by said speed responsive means, one of said relays having other contacts connecting said starting winding for energization in one sense responsive to energization of said one relay and in the reverse sense responsive to de-energization thereof whereby said motor is reversed, and a regenerative braking circuit including said running winding, said starting winding, said capacitor, and said first mentioned relay contacts when said relay is unenergized, said running and starting winding being connected to the third of said terminals.

WILBUR W. WARNER.

References Cited in the file of this patent

UNITED STATES PATENTS

| Number | Name | Date |
|---|---|---|
| 2,263,324 | Wiest | Nov. 18, 1941 |
| 2,279,210 | Spear | Apr. 7, 1942 |
| 2,279,223 | Buchanan | Apr. 7, 1942 |
| 2,285,687 | Snyder | June 9, 1942 |
| 2,380,270 | Suhr et al. | July 10, 1945 |
| 2,407,117 | Warner | Sept. 3, 1946 |